UNITED STATES PATENT OFFICE.

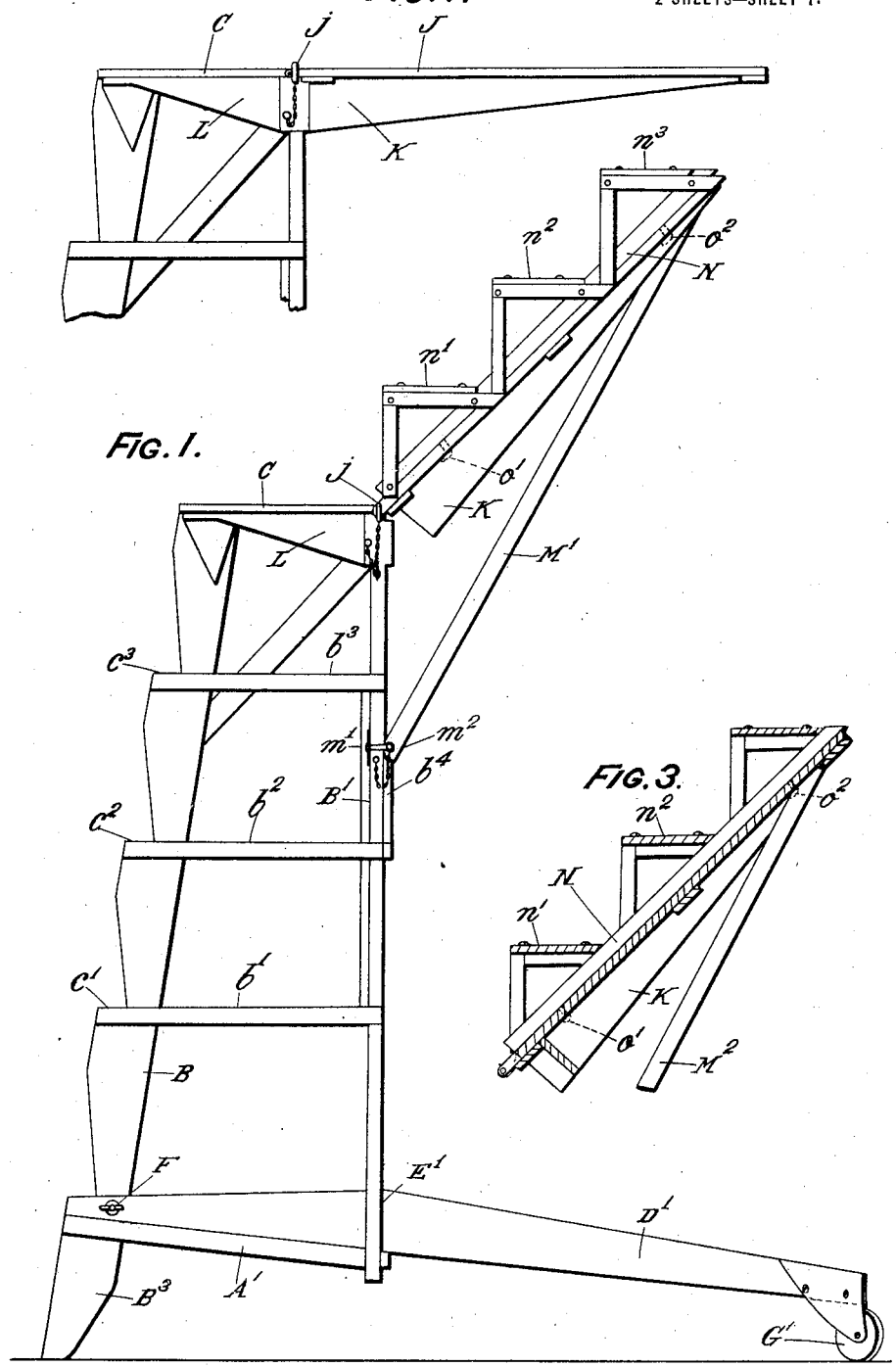

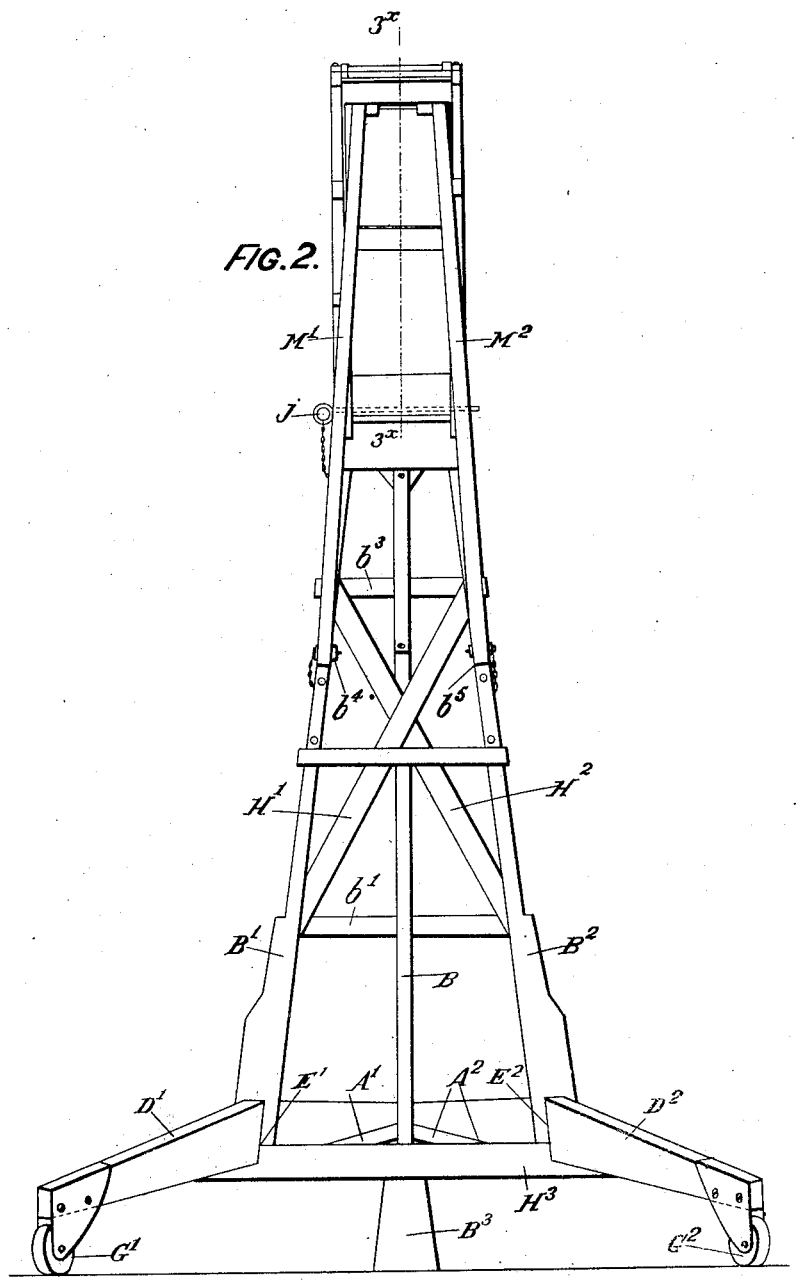

GEORGE CLOWES, OF MACCLESFIELD, ENGLAND.

PORTABLE STEPS FOR USE IN RIGGING AEROPLANES.

1,361,828.  Specification of Letters Patent.  Patented Dec. 14, 1920.

Application filed June 24, 1919. Serial No. 306,360½.

*To all whom it may concern:*

Be it known that I, GEORGE CLOWES, a subject of the King of Great Britain and Ireland, of 279 Crompton road, Macclesfield, in the county of Cheshire, England, have invented new and useful Improvements in Portable Steps for Use in Rigging Aeroplanes, of which the following is a specification.

This invention is primarily intended to supply convenient means for enabling aeroplane riggers to gain access to their work when the machine is at rest upon the ground, in which operation it is essential that they should be able to surmount its lower wing or other overhanging portion without affecting the stability of the steps or ladder by which they climb and without support from any part of the machine.

For this purpose I construct a movable framework on the following lines, as illustrated in a preferred form in the accompanying drawings, of which Figure 1 is a side elevation, Fig. 2 a rear elevation, and Fig. 3 a section in line $3^\times$—$3^\times$ of Fig. 2. Fig. 4 is a view of the upper part of Fig. 1 in lowered position and with a part removed.

Taking first a base of two equal arms $A^1$ $A^2$, connected in the form of the letter V, and adapted to lie nearly even with the ground, I affix thereto, near its apex, an upright frame-work, formed of two ladder-like frames tapering upward and inclined toward each other, so that they have a common leg or stile B, and are fixed to the apex of the V base, while the other legs $B^1$ $B^2$ have their feet fixed to the two arms $A^1$ $A^2$ and their upper ends, following lines which are respectively parallel with the said arms, connected firmly with a triangular or oblong platform C.

Arranged across and bearing on the arms A, $A^1$, are extension members $D^1$, $D^2$ which are sufficiently long to extend considerably beyond the bases of the ladders. These extension members are removable and are passed through slots $E^1$ $E^2$ in the feet of the legs $B^1$ $B^2$ and secured at the apex by a bolt F passed through the leg B. Their other ends are furnished with wheels $G^1$ $G^2$ which run on the ground.

The ladder-frames have rungs $b^1$ $b^2$ $b^3$ and the main leg B is notched into projecting steps $c^1$ $c^2$ $c^3$. Cross stays $H^1$ $H^2$ connect the legs $B^1$ $B^2$ and a stay $H^3$ also connects the arms $A^1$ and $A^2$.

I further provide an extension platform J, one end of which is hinged to the aforesaid platform C by means of a pin $j$ so that it can be set at an upward inclination or lowered to a level position, but is prevented from descending farther by a downwardly extending pair of feathers or flanges K which abuts against a corresponding pair of feathers or flanges L below the platform C. When in level position its outer end does not overhang the base line formed by the wheels $G^1$ $G^2$. It will then bear the weight of a man or more without tilting, at the same time preserving a clear space below for the wing or other interposed body, and obviating the need of trestles, planks or other encumbrances.

To enable the operator to reach a further height the hinged platform J is furnished near its outer end with a pair of struts $M^1$ $M^2$, each having one end pivoted thereto and the other end adapted to engage with stops $b^4$ $b^5$ on the said ladders and keep the platform tilted to the desired inclination. Upon this platform I place a framework of steps N with treads $n^1$ $n^2$ $n^3$, adapted to fit thereon and attached by hooks $o^1$ $o^2$ passing through slots in the platform J. The struts $M^1$ $M^2$ may be removed when not in use. The platform J may also be detached by withdrawing the hinge pin $j$. The struts $M^1$ $M^2$ are kept in engagement with the stops $b^4$ $b^5$ by means of straps $M^1$ around the legs $B^1$ $B^2$ and pins $m^2$ passed through the ends of the straps and struts.

The foot of the main leg B has a thickened extension $B^3$ so as to raise the base slightly from the ground. The structure can be dismantled as indicated and moved from place to place.

The platform C can be reached by either of the ladders or by the steps formed on the main leg B.

Additional stops may be provided on $B^1$ and $B^2$ for the struts $M^1$ $M^2$ so that the platform J may be set at any intermediate position between those shown.

The numbers or rungs, steps or other parts are not limited to those shown and details may be modified without departing from the spirit of the invention.

I claim:—

1. Steps for rigging aeroplanes, comprising a base frame, two vertical frames thereon having a common leg, a platform uniting the vertical frames at the top, extension members extending from one side of the base frame, a platform hinged to the vertical frame and overhanging the extension members, and means to maintain the last named platform in adjusted position.

2. A V-shaped base frame, legs at the corners of said frame, rungs connecting the legs, a platform connecting the upper ends of the legs, a second platform hinged to one side of the first named platform, means to maintain the second platform in adjusted position, and extension members detachably secured to the base frame and extending from one side thereof, said second platform overhanging said extension members.

Signed this day, May 26th, 1919.

GEORGE CLOWES.

Witnesses to above signature:
ARTHUR METCALFE,
DOUGLAS ENOCH WOOD.